United States Patent [19]

Storch

[11] Patent Number: 5,573,305
[45] Date of Patent: Nov. 12, 1996

[54] CUSHION PORTION AND PROCESS FOR THE PRODUCTION THEREOF

[75] Inventor: Helmut Storch, Amberg, Germany

[73] Assignee: Grammer AG, Amberg, Germany

[21] Appl. No.: 406,553

[22] Filed: Mar. 20, 1995

[30] Foreign Application Priority Data

Apr. 14, 1994 [DE] Germany .......................... 44 12 849.5

[51] Int. Cl.[6] ........................................................ A47C 7/02
[52] U.S. Cl. ................................. 297/452.41; 297/452.58; 297/284.1
[58] Field of Search ........................ 297/452.58, 452.41, 297/DIG. 3, 452.62, 452.61, 452.59, 284.6, 284.1, DIG. 1

[56] References Cited

U.S. PATENT DOCUMENTS

| | | | |
|---|---|---|---|
| 2,488,993 | 11/1949 | Teague | 297/DIG. 3 X |
| 2,731,652 | 1/1956 | Bishop | 297/DIG. 3 X |
| 3,326,601 | 6/1967 | Vanderbilt et al. | 297/284.6 |
| 3,421,163 | 1/1969 | Stoughton | 297/452.41 X |
| 4,244,764 | 1/1981 | Ginsburg | 297/452.41 X |
| 4,705,139 | 11/1987 | Gahlau et al. | 181/290 |
| 4,720,146 | 1/1988 | Mawbey et al. | 297/284.6 X |
| 4,796,955 | 1/1989 | Williams | 297/452.41 X |
| 5,314,235 | 5/1994 | Johnson | 297/284.6 X |
| 5,433,506 | 7/1995 | Jensen | 297/284.6 X |

FOREIGN PATENT DOCUMENTS

| | | |
|---|---|---|
| 3904090 | 8/1990 | Germany . |
| 3823584 | 12/1990 | Germany . |
| 4034121 | 10/1991 | Germany . |

Primary Examiner—Milton Nelson, Jr.
Attorney, Agent, or Firm—Elliot M. Olstein; Raymond J. Lillie

[57] ABSTRACT

A cushion portion has a core comprising a foamed reaction mixture optionally covered at its front side with a cover. A covering device which is stable in respect of shape is provided at the rear side of the core. Provided between the rear side of the core and the covering device is an intermediate structure comprising first and second foils which lie loosely against each other to define at least one inflatable space therebetween. A tube opens into the inflatable space for controllable inflation thereof to be able to alter the external contour of the cushion portion.

6 Claims, 2 Drawing Sheets

CUSHION PORTION AND PROCESS FOR THE PRODUCTION THEREOF

FIELD OF THE INVENTION

The invention concerns a cushion portion and a process for the production of a cushion portion.

In this specification the term cushion portion is used to denote generally any form of cushioning or cushioned upholstery arrangement which can be used for example for constituting part of a seat such as a vehicle seat.

BACKGROUND OF THE INVENTION

A typical form of cushion portion has a cushion core comprising a foamed reaction mixture which is selectively covered on its front side by a cover such as a fabric and which on its rear side has a covering means which is stable in respect of shape, for example to provide a rigid support for the rear of the cushion core. Such a cushion portion can be produced by a process wherein a reaction mixture is introduced into a mold defining the cushion core, possibly after the introduction of a cover such as a fabric. The reaction mixture foams up to define the core in the mold which is closed by a first closure member and which thus defines a first mold cavity. The first closure member is then removed from the mold and replaced by a second closure member which defines between itself and the core that has remained in the first mold cavity, a second mold cavity into which a pouring or casting material is then introduced, which after setting forms the covering means which is stable in respect of shape, at the rear side of the core.

A form of process for producing a cushion portion with reaction mixtures of different hardnesses involves a procedure whereby a casting mold is closed by a first closure member, whereupon a first reaction mixture is introduced into the first mold cavity which is defined by the first closure member. After the reaction has occurred, the first reaction mixture fills the first cavity in the form of a first foam body. The first closure member is then removed from the mold and replaced by a second closure member, the first foam body remaining in the mold in that phase of the operation so that a second mold cavity is formed between the first foam body that has remained in the mold, and the second closure member. A second reaction mixture is then introduced into the second mold cavity and fills the latter after the reaction has taken place, in the form of a second foam body which forms a unit with the first foam body. That process which is disclosed in DE 38 23 584 C2 provides that a cover material is introduced into the mold, prior to its being closed by the firs t closure member, in closely contacting relationship with the mold. The soft-foam reaction mixture constituting the first reaction mixture then foams up to form a foam backing for the cover material. A hard-foam reaction mixture is introduced into the second mold cavity as the second reaction mixture, to form a support part for the cushion portion afforded by the foam backing on the cover material. It will be seen that the cushion portion produced by this process is of a predetermined and invariable shape.

A seat and more particularly a vehicle seat comprising a seat cushion and a backrest cushion and at least one inflatable cushion or pillow member is disclosed in DE 39 04 090 A1. In order to adjust that seat to the anatomical parameters of the respective occupant thereof, provided in the backrest cushion is at least one inflatable cushion or pillow or pad-like member having a porous, elastically yielding foam portion and an elastic air-tight foil which encloses the foam portion and which is provided with a valve for adjusting the amount of air for inflating the cushion member. A seat of that kind not only requires the appropriate cushion members to be produced and kept in store, for use as required, but it also involves a need for the inflatable cushion member to be disposed in the backrest cushion portion, which has an adverse effect on the manufacturing costs of such a seat.

DE 40 34 121 A1 discloses a seat having self-inflatable cushion or pad members which are disposed in the two side portions of the seat squab surface and in the two side portions of the backrest. The cushion or pad members are in fluid communication with valves which are provided for adjusting the amount of air therein. In order to enhance the level of operating convenience of that seat, all the valves can be simultaneously actuated by means of a common operating member. In terms of assembly and storage the same considerations apply here as in relation to the above-discussed seat of DE 39 04 090 A1.

SUMMARY OF THE INVENTION

An object of the present invention is to provide a cushion portion affording improved adjustability of its configurational contour while still being of simple design structure.

Another object of the present invention is to provide a cushion portion which affords improved comfort for the occupant of a seat in which the cushion portion is used, while being inexpensive and relatively easy to produce.

Still another object of the present invention is to provide a process for the production of a cushion portion which enjoys adjustability in terms of its configuration, while involving a simple and inexpensive manufacturing procedure.

In accordance with the present invention, in a first aspect thereof, the foregoing and other objects are attained by a cushion portion including a cushion core comprising a foamed-up reaction mixture which is selectively covered at its front side with a cover and which at its rear side has a covering means which is stable in respect of shape. Disposed between the rear side of the core and the covering means is an intermediate structure means comprising first and second foils which bear loosely against each other to provide at least one inflatable space. A tube means such as a hose is operatively associated with the at least one inflatable space, one end portion thereof opening into the space between the foils of the intermediate structure means while the second end portion of the tube means projecting out of the cushion portion.

As will be seen in greater detail from the description hereinafter of a preferred embodiment, the intermediate structure means comprising the first and second foils is easy to handle in the course of manufacture. A further advantage of a cushion portion of such a configuration is that the intermediate structure means requires virtually no space of its own, in other words, it is not obtrusively noticeable on the finished cushion portion in the non-inflated condition.

In regard to the aspect of the intermediate structure means comprising the first and second foils being particularly easy to handle, in accordance with a preferred feature of the invention the two foils can be glued together in a line-like or strip-like joining configuration, to define the at least one inflatable space, with a tube means opening into the or each space. That affords a so-to-speak one-piece intermediate structure means which as mentioned is very easy to handle.

In accordance with another preferred feature of the cushion portion according to the invention the first and second foils constituting the intermediate structure means may be of the same dimensions in terms of area, but it may be desirable if the first foil which is towards the core is of a larger surface area extent than the second foil which is towards the covering means that is stable in respect of shape and thus rigid, with the second foil being arranged on the first foil in such a way that the first foil forms an edge portion that extends therearound and that projects beyond the edge of the second foil. In that way, the intermediate structure means can be mechanically firmly and fixedly connected to the covering means by way of the edge portion extending around the periphery of the first foil.

From recycling points of view, a further preferred feature of the invention provides that at least the first foil that is towards the core comprises a material which is of the same general nature as the material of the core. That can further afford the advantage that the first foil is connected to the core over a large area. For example the core can comprise a polyurethane foam material while the covering means can comprise a polyurethane coating material and the first foil can be a polyurethane foil. The second foil of the intermediate structure means can for example simply comprise paper. This does not cause any problems because in any case the second foil is completely covered by the airtight covering means at the rear of the cushion portion. It will be seen therefore that the second foil forms so-to-speak a separation means between the covering means and the core. From a recycling point of view, as already mentioned above, it is desirable for not only the covering means but also the tube means which opens into the at least one inflatable space to be made from a material which is of the same general nature as the material of the core. This means that for example the at least one tube means can also consist of polyurethane.

Further in accordance with the invention, in terms of the process aspect thereof, the foregoing and other objects are attained by a process for the production of a cushion portion wherein a reaction mixture is introduced into a mold for defining a cushion core, possibly after the introduction of a cover, the reaction mixture foams up to form the cushion core in the mold which is closed by a first closure means to define a first mold cavity, and then the first closure means is removed from the mold and replaced by a second closure means which defines between itself and the core which has remained in the first mold cavity a second mold cavity into which there is then introduced a casting or pouring material which after setting forms a covering means which is stable in respect of shape, at the rear side of the core. Arranged at the rear side of the core in the first mold cavity is an intermediate structure means comprising a first and a second foil which bear loosely against each other to form at least one inflatable space. An associated tube means has a first end portion opening into the corresponding inflatable space between the first and second foils, with the second end portion thereof projecting out of the mold. The second mold cavity is then filled with the pouring or casting material, the intermediate structure means consisting of the first and second foils being fixed after setting of the pouring or casting material between the covering means and the core.

It will be noted in that respect that the first and second foils of the intermediate structure means may be separate foils which are independent of each other, but it is also possible to employ an intermediate structure means in which the foils are glued together in a line or strip joining configuration to form at least one inflatable space, with an associated tube or hose communicating with that space. As the covering means which is stable in respect of shape is gas-impermeable, when the pouring or casting material is in the set and hardened condition, the second foil which is towards the covering means can readily comprise an air-permeable material without that causing any problem in that respect. As already mentioned above the second foil can comprise paper. The first foil of the intermediate structure means may also comprise an air-permeable material if the cover which covers the cushion portion on the front side, that is to say on the outward side thereof, comprises an air-permeable material. As however such a cover can adversely affect what can be referred to as the seating climate of the cushion portion, that is to say the general feel of sitting on such a cushion portion in terms of humidity content, temperature, ventilation effect in the seat and so forth, it is desirable to use a cover which is air-permeable. It is then preferable in that case for the first foil to be made from air-impermeable or gas-impermeable material so that the intermediate structure means can be inflated as required through the associated at least one tube means, whereby the cushion portion can be caused to adopt a correspondingly outwardly curved configuration to afford the required cushion contour.

Another preferred feature of the invention provides that disposed on the rear side of the core is an intermediate structure means in which the first foil that is towards the core is of larger dimensions in terms of surface area than the second foil that is towards the covering means, wherein the second foil is disposed on the first foil in such a way that the first foil has an edge portion that extends therearound projecting beyond the second foil. That provides that the intermediate structure means is reliably held fast in position between the core and the covering means. This is because, by means of the peripherally extending edge portion, it is then possible to achieve a mechanically strong connection between the intermediate structure means and the covering means, with the first foil usually being joined over a large area to the material of the core.

Further objects, features and advantages of the present invention will be apparent from the following description of the essential steps of a preferred embodiment of the process of the invention for the production of a cushion portion and a preferred embodiment of the cushion portion according to the invention produced by that process.

DESCRIPTION OF THE PREFERRED EMBODIMENT

Figure 1:
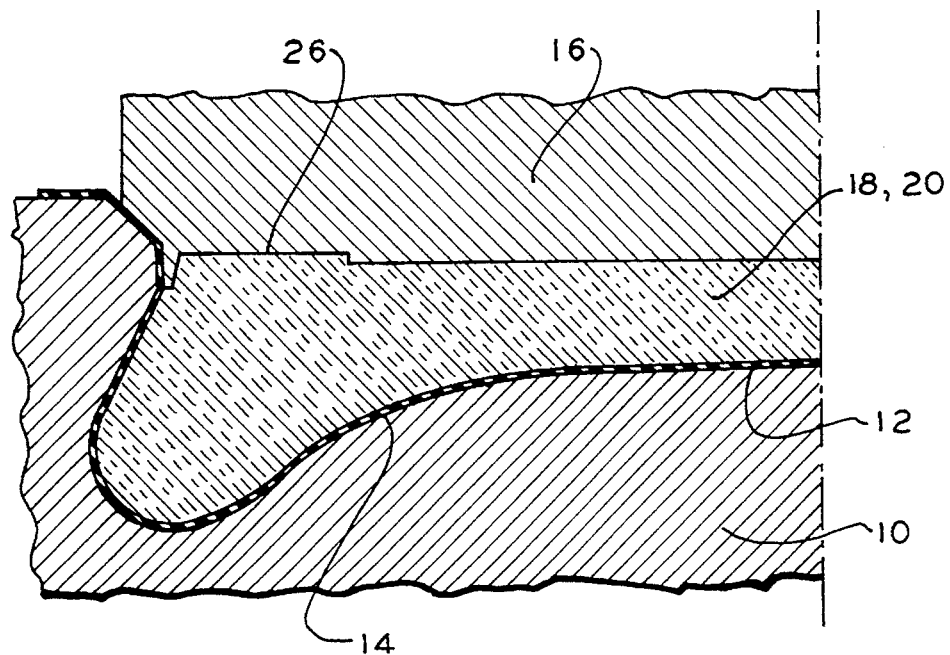
FIG. 1 is a sectional view of a half of a mold having a first closure member for forming a cushion core.

Referring firstly to FIG. 1, shown in section therein is half of a mold 10 with a mold cavity therein defined in part by a contour surface as indicated at 12. Reference 14 indicates a cover such as a suitable seat cover material which is introduced into the mold 10 and applied snugly and in a fold-free condition against the contour surface 12. That is effected for example in known manner by means of a vacuum. After the cover 14 has been introduced into the mold 10 in closely contacting relationship therewith, the mold 10 is closed by a first closure member 16 so that a first mold cavity as indicated generally at 18 is defined between the closure member 16 and the contour surface 12 of the mold 10. A reaction mixture is then introduced into the first mold cavity 18, for example when the mold 10 is closed by the first closure member 16, through a suitable pouring or casting head (not shown). The reaction mixture foams up in the first mold cavity 18 and thus completely fills it. It will be noted however that it is also possible for the reaction mixture to be introduced into the mold 10 when the first closure member 16 has not yet been fitted to the mold 10, so that the mold 10 is then closed by the first closure member 16 immediately after the operation of introducing the reaction mixture. In that case the reaction of the reaction mixture takes place in the first mold cavity 18 at the same time as fitment of the first closure member, so that the reaction mixture then completely fills the first mold cavity 18.

The reaction mixture which thus forms a foam backing on the cover 14 in the mold cavity 18 then forms a cushion core 20 which is defined by the first mold cavity 18.

Figure 2:
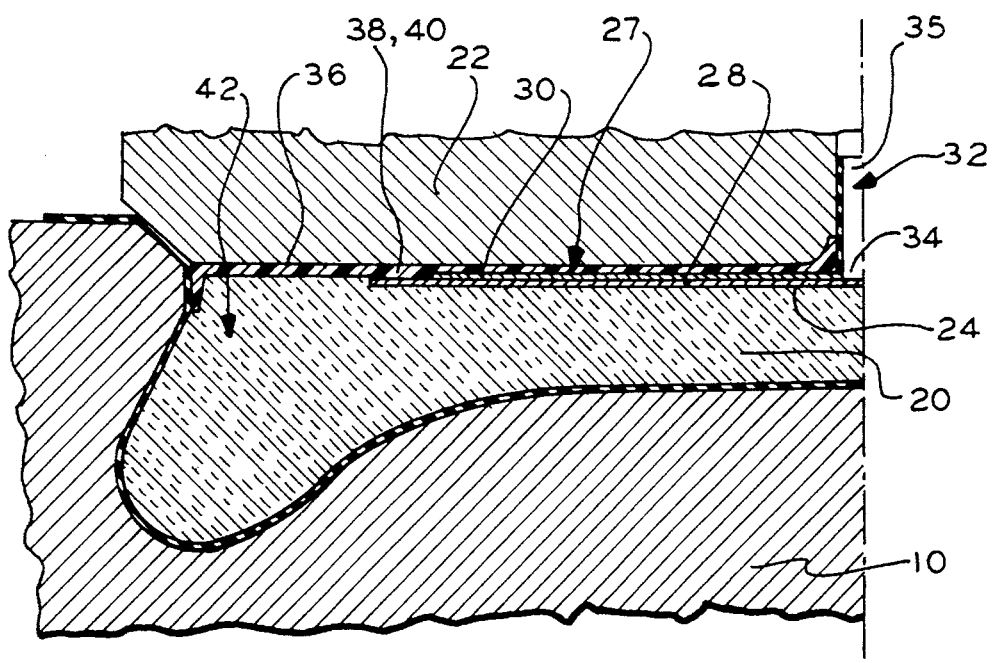
FIG. 2 is a view similar to FIG. 1 of the mold with a second closure member which replaces the first closure member on the mold after a reaction mixture has been introduced into the first mold cavity of the mold and after removal of the first closure member.

The first closure member 16 is then removed from the mold 10 and a second closure member 22 is disposed on the mold 10, as shown in FIG. 2. Before the second closure member 22 is disposed on the mold 10 or at the same time as the second closure member 22 is disposed on the mold 10, an intermediate structure means 27 comprising a first foil 28 and a second foil 30 is arranged at the rear side 24 of the core 20, that rear side corresponding to the surface contour as indicated at 26 in FIG. 1 of the first closure member 16. The first foil 28 and the second foil 30 can generally be disposed in a condition of bearing loosely against each other, but it may be desirable for the first and second foils 28 and 30 to be glued together in a line-like or strip-like joining configuration, to afford at least one inflatable space therebetween. A tube or hose 32 has its one end portion as indicated at 34 in FIG. 2 opening into the at least one space between the foils 28 and 30. The second end portion 35 of the tube 32, which is remote from the first end portion 34, projects sufficiently far away from the intermediate structure means 26 for it to be used for inflating the space between the foils 28 and 30, as required.

The second closure member 22 has a surface contour as indicated at 36 in FIG. 2 such that a second mold cavity 38 is formed between that surface contour 36 and the rear side 24, which is fitted with the intermediate structure means 27, of the core 20 which has remained in the mold 10. A casting or pouring material is then poured into the second mold cavity 38 by means of a suitable pouring or casting head (not shown). That material hardens and in the hardened condition forms a covering means 40 which is stable in respect of shape and thus rigid and which is integrally connected to the core 20, to provide support therefor. The at least one tube 32 has its second end portion 35 projecting out of the covering means 40 of the finished cushion portion as indicated generally at 42 in FIG. 2.

After the second closure member 22 is removed from the mold 10, it is then possible for the finished cushion portion 42 to be removed from the mold 10.

Figure 3:
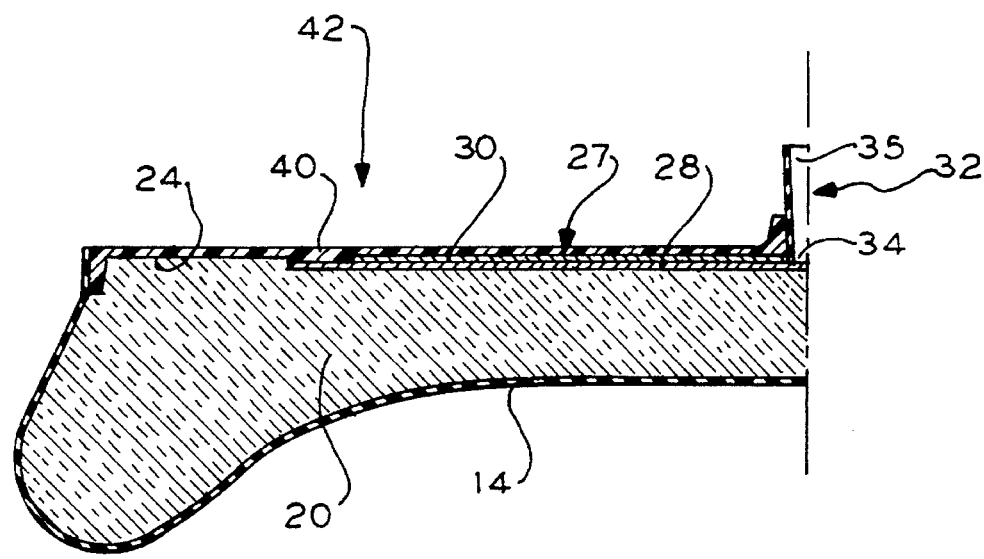
FIG. 3 is a view in section of a half of a cushion portion produced in a mold as shown in FIGS. 1 and 2, in the original non-inflated condition.

Reference is now made to FIG. 3 showing in section one half of such a cushion portion 42. The same features and details are identified by the same references in FIG. 3 as in FIGS. 1 and 2, so that there is no need in the description relating to FIG. 3 for all those features and details of the cushion portion 42 to be described in detail once again.

Figure 4:
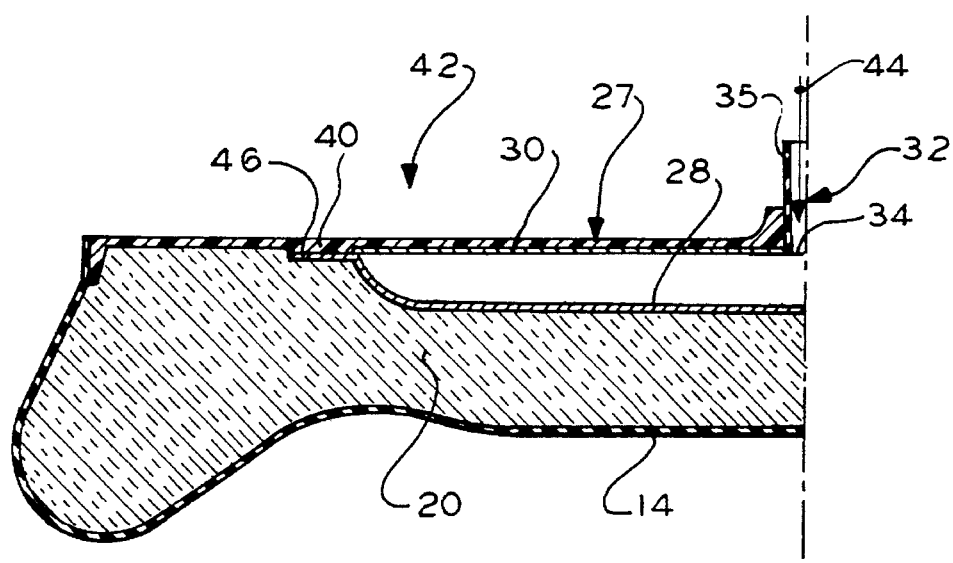
FIG. 4 is a sectional view corresponding to FIG. 3 of the half of the cushion portion in the inflated and thus outwardly bulging condition.

While the cushion portion 42 is shown in FIG. 3 in the non-inflated condition, FIG. 4 shows half of the cushion portion 42 corresponding to FIG. 3 but in the inflated condition, as is indicated in FIG. 4 by the arrow 44 showing the inflation air flow into the inflation space. In the inflated condition the first foil 28 is separated from the second foil 30 with the core 20 at the same time being correspondingly curved outwardly in the region of the core 20 corresponding to the intermediate structure means 27. This situation can be clearly seen from FIG. 4.

It will be seen from FIGS. 1 through 4 that it may be desirable for the first foil 28 to be of a larger area than the second foil 30 so that the first foil 28 has an edge portion 46 which extends therearound and which projects beyond the edge of the second foil 30. The edge portion 46 is thus joined both to the covering means 40 and to the core 20 in a mechanically firm fashion.

As, in order to afford a good seating climate with such a cushion portion 42, it may be desirable for the cover 14 which covers the cushion portion 42 at the front side or side on which the seat occupant actually sits to be of an air-permeable nature, it is preferable for the first foil 28 to be made of a gas-impermeable foil material. The second foil 30 can comprise any suitable material such as for example paper because in that case there is no need for it to involve a corresponding sealing effect in consequence of the gas- or air-impermeability of the covering means 40.

It will be appreciated that the above-described embodiment of the cushion portion and the process for the production thereof in accordance with the present invention have been set forth solely by way of example and illustration of the principles of the invention and that various other modifications and alterations may be made therein without thereby departing from the spirit and scope of the invention.

What is claimed is:

1. A cushion portion including a cushion core having a front side and a rear side; a covering means which is stable in respect to shape at the rear side of the core; an intermediate structure means disposed between the rear side of the core and the covering means, said intermediate structure means comprising first and second foils which lie against each other loosely to provide at least one inflatable space, wherein the first foil is adjacent the core and has a larger surface area than the second foil, said second foil being adjacent the covering means, said second foil being disposed on said first foil such that said first foil forms an edge portion that extends beyond said second foil, said edge portion of said first foil being fixedly connected to said covering means, and at least one tube means having first and second end portions and operatively associated with said at least one inflatable space, said first end portion of said tube means opening between the foils of the intermediate structure means into said at least one space, and said second end portion of said tube means extending out of said cushion portion.

2. A cushion portion as set forth in claim 1 and further including a cover covering the core at its front side.

3. A cushion portion as set forth in claim 1 wherein at least the first foil which is adjacent the core comprises a material which is principally equivalent to the material of the core.

4. A cushion portion as set forth in claim 1 wherein the covering means comprises a material which is principally equivalent to the material of the core.

5. A cushion portion as set forth in claim 1 wherein the tube means comprises a material which is principally equivalent to the material of the core.

6. A cushion portion as set forth in claim 1 wherein the foils of the intermediate structure means are glued together forming the at least one inflatable space, with the tube means opening into said at least one space.

* * * * *